US009830265B2

(12) United States Patent
Rowlands et al.

(10) Patent No.: US 9,830,265 B2
(45) Date of Patent: Nov. 28, 2017

(54) REUSE OF DIRECTORY ENTRIES FOR HOLDING STATE INFORMATION THROUGH USE OF MULTIPLE FORMATS

(71) Applicant: NETSPEED SYSTEMS, San Jose, CA (US)

(72) Inventors: Joe Rowlands, San Jose, CA (US); Sailesh Kumar, San Jose, CA (US)

(73) Assignee: NetSpeed Systems, Inc., San Jose, CA (US)

( * ) Notice: Subject to any disclaimer, the term of this patent is extended or adjusted under 35 U.S.C. 154(b) by 873 days.

(21) Appl. No.: 14/085,106

(22) Filed: Nov. 20, 2013

(65) Prior Publication Data

US 2015/0143050 A1    May 21, 2015

(51) Int. Cl.
| | | |
|---|---|---|
| G06F 12/00 | (2006.01) | |
| G06F 12/084 | (2016.01) | |
| G06F 9/50 | (2006.01) | |
| G06F 12/0817 | (2016.01) | |
| G06F 12/0811 | (2016.01) | |
| G06F 12/0815 | (2016.01) | |

(52) U.S. Cl.
CPC .............. *G06F 12/084* (2013.01); *G06F 9/50* (2013.01); *G06F 12/082* (2013.01); *G06F 12/0811* (2013.01); *G06F 12/0815* (2013.01); *G06F 12/0817* (2013.01); *G06F 12/0826* (2013.01); *G06F 12/0828* (2013.01)

(58) Field of Classification Search
CPC ...... G06F 12/084; G06F 9/50; G06F 12/0817; G06F 12/0811; G06F 12/082; G06F 12/0815; G06F 12/0828; G06F 12/0826

USPC .......................... 711/141, 145, 146, 128, 130
See application file for complete search history.

(56) References Cited

U.S. PATENT DOCUMENTS 5,432,785 A    7/1995  Ahmed et al.
5,764,740 A    6/1998  Holender
(Continued)

FOREIGN PATENT DOCUMENTS

| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.
(Continued)

*Primary Examiner* — Hong Kim
(74) *Attorney, Agent, or Firm* — Procopio, Cory, Hargreaves & Savitch LLP (57) ABSTRACT

The present application is directed to a control circuit that provides a directory configured to maintain a plurality of entries, wherein each entry can indicate sharing of resources, such as cache lines, by a plurality of agents/hosts. Control circuit of the present invention can further provide consolidation of one or more entries having a first format to a single entry having a second format when resources corresponding to the one or more entries are shared by the agents. First format can include an address and a pointer representing one of the agents, and the second format can include a sharing vector indicative of more than one of the agents. In another aspect, the second format can utilize, incorporate, and/or represent multiple entries that may be indicative of one or more resources based on a position in the directory.

18 Claims, 6 Drawing Sheets

(56) References Cited

U.S. PATENT DOCUMENTS

| | | | |
|---|---|---|---|
| 5,991,308 A | 11/1999 | Fuhrmann et al. | |
| 6,003,029 A | 12/1999 | Agrawal et al. | |
| 6,249,902 B1 | 6/2001 | Igusa et al. | |
| 6,415,282 B1 | 7/2002 | Mukherjea et al. | |
| 6,925,627 B1 | 8/2005 | Longway et al. | |
| 7,065,730 B2 | 6/2006 | Alpert et al. | |
| 7,318,214 B1 | 1/2008 | Prasad et al. | |
| 7,590,959 B2 | 9/2009 | Tanaka | |
| 7,725,859 B1 | 5/2010 | Lenahan et al. | |
| 7,808,968 B1 | 10/2010 | Kalmanek, Jr. et al. | |
| 7,917,885 B2 | 3/2011 | Becker | |
| 8,050,256 B1 | 11/2011 | Bao et al. | |
| 8,059,551 B2 | 11/2011 | Milliken | |
| 8,099,757 B2 | 1/2012 | Riedl et al. | |
| 8,136,071 B2 | 3/2012 | Solomon | |
| 8,281,297 B2 | 10/2012 | Dasu et al. | |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2004/0216072 A1 | 10/2004 | Alpert et al. | |
| 2005/0147081 A1 | 7/2005 | Acharya et al. | |
| 2006/0161875 A1 | 7/2006 | Rhee | |
| 2007/0118320 A1 | 5/2007 | Luo et al. | |
| 2007/0233932 A1* | 10/2007 | Collier | G06F 12/082 711/100 |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0070726 A1 | 3/2009 | Mehrotra et al. | |
| 2009/0268677 A1 | 10/2009 | Chou et al. | |
| 2009/0313592 A1 | 12/2009 | Murali et al. | |
| 2010/0040162 A1 | 2/2010 | Suehiro | |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0154282 A1 | 6/2011 | Chang et al. | |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0110541 A1 | 5/2012 | Ge et al. | |
| 2012/0155250 A1 | 6/2012 | Carney et al. | |
| 2012/0173819 A1* | 7/2012 | Solihin | G06F 12/0817 711/119 |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0326458 A1 | 12/2013 | Kazda et al. | |
| 2014/0032829 A1* | 1/2014 | Solihin | G11C 7/1072 711/105 |
| 2014/0032853 A1* | 1/2014 | Lih | G06F 12/0817 711/141 |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |
| 2014/0229680 A1* | 8/2014 | Solihin | G06F 12/082 711/135 |
| 2014/0237186 A1* | 8/2014 | Cox | G06F 12/0831 711/122 |
| 2015/0052309 A1* | 2/2015 | Philip | G06F 12/082 711/128 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, F, et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 1 pgs.

Lee, J. W, et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2014/012003, dated Mar. 26, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

REUSE OF DIRECTORY ENTRIES FOR HOLDING STATE INFORMATION THROUGH USE OF MULTIPLE FORMATS

BACKGROUND

Technical Field

Methods and example implementations described herein are generally directed to hardware systems, and more specifically, to management of resources in a hardware system.

Related Art

In related art computer systems, instructions and data were stored in and fetched from a main storage, requiring a memory management system for execution or use by a central processor unit, or possibly by some special function unit, such as a floating-point processor. In few systems, some instructions and data may be retained after their use in a cache memory, which can be accessed more quickly than the main storage. As a result, such instructions and data can be reused later in the execution of the same program. This related art scheme improves execution performance of computer systems by reducing the time taken to fetch the instructions and data for processing by central processing unit.

In related art computer systems that have cache memories, number of cycles required to retrieve an instruction or a data item depends on whether the data item is already in the cache or not, and on how many instructions are required to address or retrieve the data item. If the data item is not in the cache (e.g., a "cache miss"), the instruction or data item must be fetched from main memory, which consumes some number of instruction cycles. If the data item is in the cache, some instruction cycles will also be consumed, although the consumed instruction cycles will be fewer than in the case of a cache miss. Nevertheless, any improvement that can be made in processing of cached data and instructions is useful. In certain circumstances, improvement may make a considerable difference to the processing performance of the system.

Figure 1A:
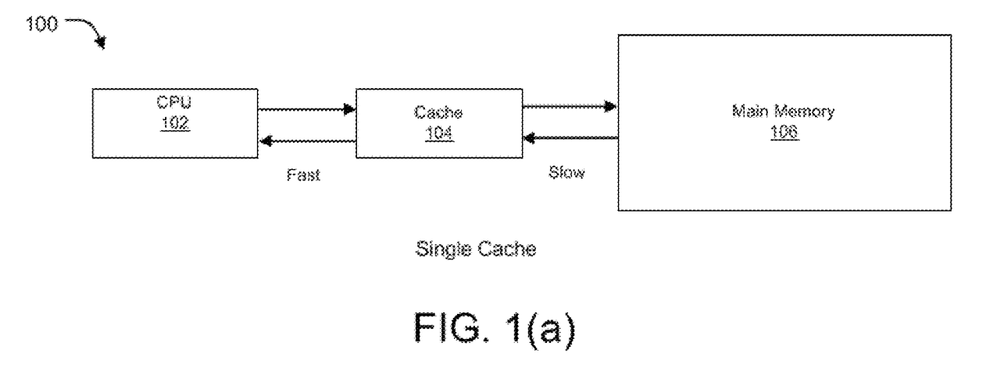
FIG. 1(a) and FIG. 1(b) illustrate example cache memory architectures respectively showing placement of cache memory in the hardware layout.
Figure 1B:
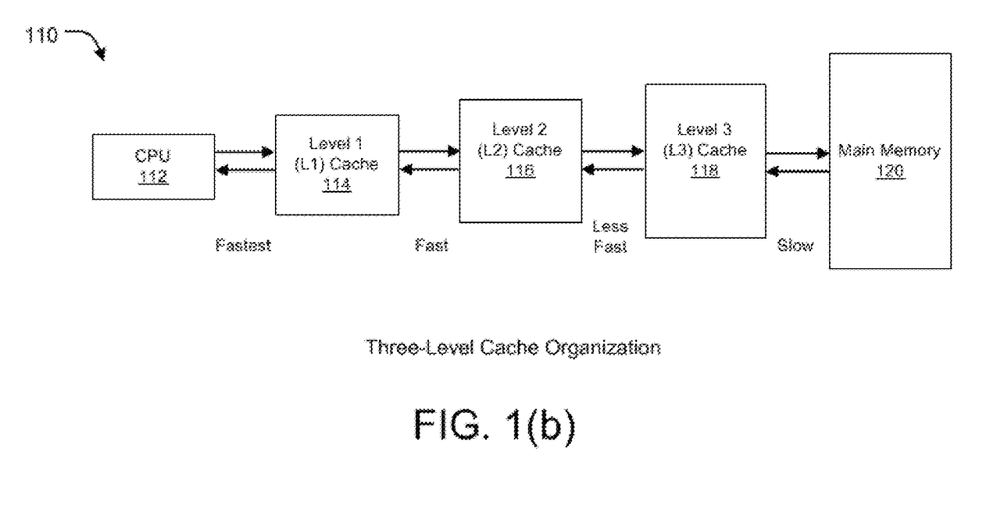

FIG. 1(a) and FIG. 1(b) illustrate cache memory architectures 100 and 110 respectively, showing placement of cache memory in the hardware layout. As is illustrated, cache memory 104 is positioned between CPU 102 and main memory 106. Data block access from the cache 104 is much faster when compared with access of the same data block from the main memory 106. Similarly, FIG. 1(b) illustrates multiple caches 114, 116, and 118 configured between the CPU 112 and main memory 120.

In most related art, caching techniques have a fundamental tradeoff between cache latency and hit rate, wherein larger caches have better hit rates but longer latency. To address this tradeoff, many computers use multiple levels of cache, with small fast caches backed up by larger, slower caches. Multi-level caches generally operate by checking the smallest level 1 (L1) cache 114 first. If a hit occurs in L1, the processor proceeds at high speed. If the smaller cache misses, the next larger cache 116 (L2) is checked, and so on to L3 caches such as 118, before external/main memory 120 is checked.

Figure 2A:
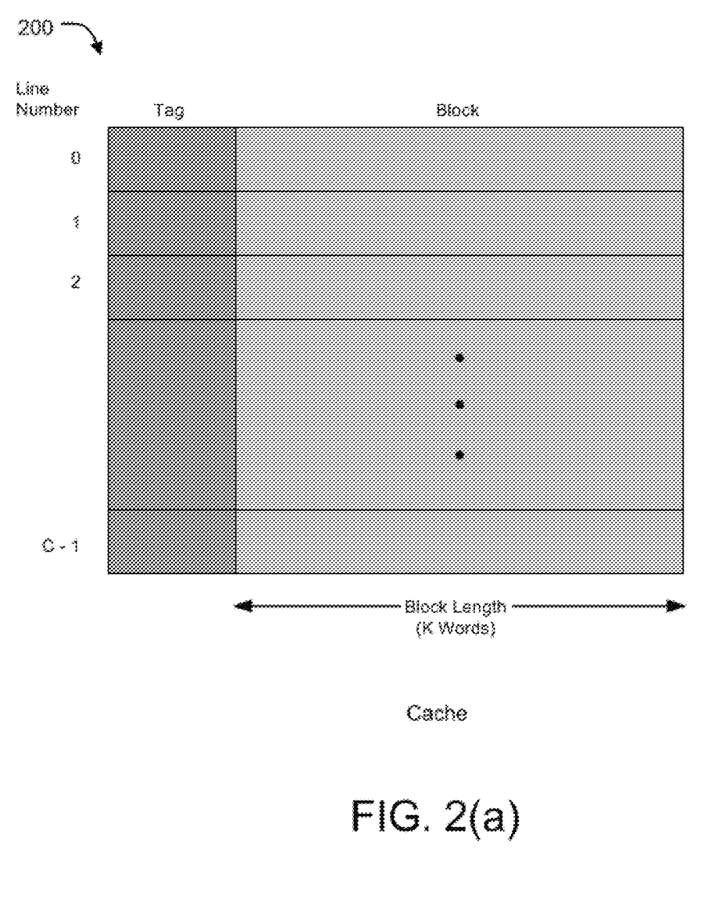
FIG. 2(a) illustrates structural layout of cache memory.
Figure 2B:
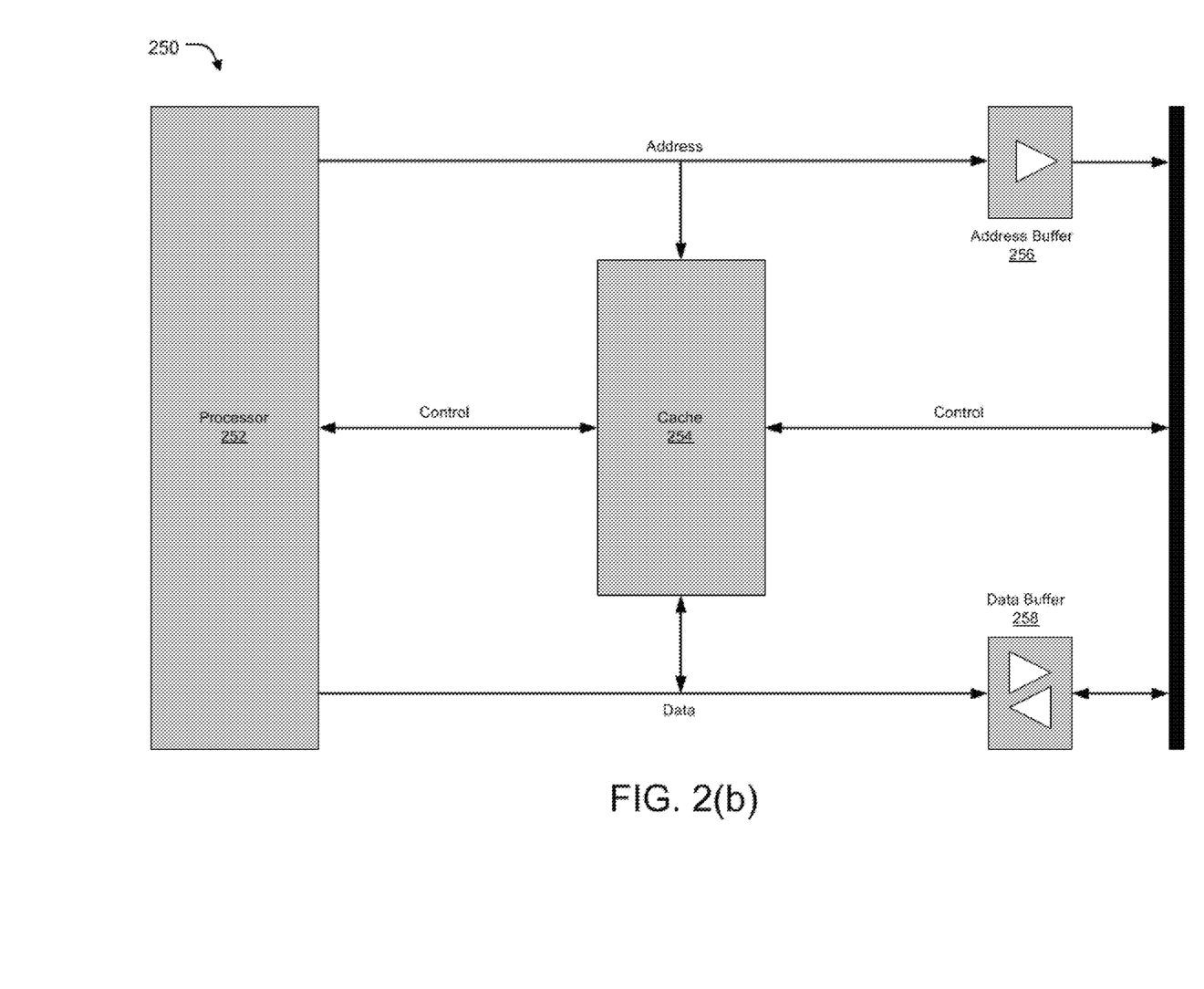
FIG. 2(b) illustrates interactions between processor and cache through address and data lines.

FIG. 2(a) illustrates structural layout of cache memory 200. As is illustrated, the cache memory 200 comprises multiple blocks, each having a length of K words. Each block line is also associated with a tag that identifies the block being stored. Tag is usually the upper portion of the memory address. As illustrated, the cache memory 200 comprises C blocks, which is much lesser than the number of blocks, say M, of the main memory. FIG. 2(b) illustrates architectural layout of interactions 250 between cache memory 254, processor 252, and system bus 260 through address buffer 256 and data buffer 258. As represented, processor 252 sends address level instructions to the cache to identify the location of data block that is to be fetched along with issuing data requests to the cache 254. Address information paths are provided between the CPU 252, cache 254, and address buffer 256, whereas data information paths are provided between CPU 252, cache 254, and data buffer 258. The cache 254, address buffer 256, and the data buffer 258 all interact with the system bus 260 to receive data blocks and interact with the main memory (not shown).

Typically, a cache is divided into a number of sets of lines, wherein each set comprises a fixed number of lines. A data block from main memory can be configured to map to any line in a given set determined by the respective block address. For instance, in case there are "m" number of lines in the cache, "v" number of sets, and "k" number of lines per set, the value of k would be k=m/v. In such a case, a main memory block number "j" can be placed in a set "i" based on the equation, i=j modulo v.

Improvements in cache memory performance have been sought using various methods of linking and associating groups of cache lines so as to form a policy that is configured to decide where in the cache a copy of a particular entry of main memory will go. If the policy is free to choose any entry in the cache to hold the copy, the cache is called "fully associative". At the other extreme, if each entry in main memory can go in just one place in the cache, the cache is "direct mapped". Many caches implement a compromise in which each entry in main memory can go to any one of N places in the cache, and are described as "N-way set associative". For instance, in a 2-way set associative, any particular location in main memory can be cached in either of 2 locations in a data cache. Similarly, in a 4-way set associative, any particular location in main memory can be cached in either of 4 locations in a data cache. Multiple algorithms can be used for determining the location in which the data block can be stored.

Indexing in a cache design refers to a method of storing each address in a subset of the cache structure. A common related art mechanism involves using low-order address bits to determine the entry, or the set of entries, that the data block can be stored. By restricting addresses to a very small set of entries, there is a possibility that the most useful data (usually the most recently used data) may all map to the same set of entries. Such a mapping would limit the effectiveness of the cache by utilizing only a subset of the entire structure. For indexed caches to work effectively, the addresses needed by a program at any particular time need to be spread across all of the sets of the cache. Addresses spread across the cache allow full use of the lines in the cache. Most programs naturally have a good distribution of addresses to sets, which is one reason caches work well in general.

A cache miss refers to a failed attempt to read or write a piece of data in the cache, which results in a main memory access with much longer latency. A cache read miss from an instruction cache generally causes the most delay, because the processor, or at least the thread of execution, has to wait (e.g., stall) until the instruction is fetched from main memory. A cache read miss from a data cache, on the other hand, usually causes less delay, because instructions not dependent on the cache read can be issued and continue execution until the data is returned from main memory, and the dependent instructions can resume execution. A cache write miss to a data cache generally causes the least delay, because the write can be queued and there are few limitations on the execution of subsequent instructions. The processor can continue until the queue is full.

Lowering the cache miss rate is a major area of focus. Therefore a great deal of analysis has been done on cache behavior in an attempt to find the best combination of size, associativity, block size, and so on. There can be multiple kinds of cache misses, which can impact the cache and processing performance in different ways. For instance, compulsory misses are those misses that are caused by the first reference to a location in memory. Cache size and associativity make no difference to the number of compulsory misses but prefetching data can help here, as can larger cache block sizes. Capacity misses are those misses that occur regardless of associativity or block size of the cache memory, solely due to the finite size of the cache. Conflict misses, on the other hand, are misses that could have been avoided had the cache not evicted an entry earlier. Conflict misses can be further broken down into mapping misses, that are unavoidable given a particular amount of associativity, and replacement misses, which are due to the particular victim choice of the policy (e.g., such as a replacement policy).

While the natural address distribution in programs is generally acceptable, cache performance is often limited by inadequate distribution. Some critical code sequences may concentrate activity in a particular set, which results in new lines replacing other lines that are still useful. If a program tries to access the replaced lines, the program will result in a cache miss and performance will be reduced while the processor waits for the cache to be refilled. As explained above, these caches misses are referred to as conflict misses. Cache itself may be large enough to store all of the useful lines, but limitations due to indexing force useful lines out of the cache even though there are less useful lines elsewhere in the cache.

There are a few methods of reducing the problem of conflict misses. One way is to allow each address to go to multiple locations (set-associative). This method allows hardware to choose among several possible lines in the cache to evict. Performance can be improved by carefully selecting which line to replace, making sure the least useful address is replaced. A different approach to reducing conflict misses is to improve upon the natural distribution of addresses across sets. Using low-order bits provides a good distribution, but some patterns may exist that lead to less distribution and more conflicts. These patterns can happen because programs are written by people and compiled in a non-random manner.

To improve distribution, an index hash can be used. Hashing involves manipulating the address in such a way that any natural pattern is less likely. Hashing can be implemented by means of a hash table that uses a hash function to compute an index into an array of buckets or slots, from which the correct value can be found. As hash functions typically introduce randomness in placement of data blocks based on indexes calculated such as by XOR'ing high-order bits with low-order bits, usage of hash tables is one way to "randomize" the placement of data blocks, which can lead to a more even distribution.

In order to make room for storing additional blocks (e.g., data or instructions copied from the storage device or the memory device), each cache may have a replacement policy that enables the cache to determine when to evict (e.g., remove) particular blocks from the cache. Multiple replacement policies exist for deciding which position to load the new data block to. A random replacement policy, for instance, places the new data block in any set/block of the cache memory, but increases the probability of the miss rate, as high priority data blocks may be made to leave the cache in such a process. Other policies can include first in, first out (FIFO), which makes the oldest block exit from the cache. Least recently used (LRU) is yet another technique used for block replacement.

Shared-memory multiprocessors have been applied quite considerably in high performance computing and continue to become more relevant in the age of large multicore systems on chip (SoC). Address space is typically shared among multiprocessors so that they can communicate with each other through that single address space. In such architectures, same cache block across multiple caches may result in a system with caches because of sharing of data. This problem does not affect the read process. However, during a write operation, when one processor writes to one location, the change has to be updated to all caches. Most cache coherency protocols have a shared state in which data can be shared between any number of system components (e.g., processors). Such a shared (S) state arises when a system component requests a read-only copy of the data and the data was already in an Exclusive (E) state in another system component.

Each of the requesting system component and the system component that had a copy of the data can mark the data in shared state. When data is in the shared state, it can be freely copied by the system components by requesting a read-only copy of the data. In a system, cache coherency protocols can either permit a system component to provide the shared data to a requesting system component or the data can be retrieved from the coherency maintenance data structure directly.

In directory-based cache coherency systems, cache line addresses being shared by agents in the system are tracked in a common directory that maintains coherence information between agent caches. Such a directory acts as a filter through which a processor must ask permission to load an entry from the primary memory to its cache. When an entry is changed, the directory either updates or invalidates the other caches with that entry. A cache coherence protocol uses data structures and messaging to track and co-ordinate locations of all cached copies of every block of shared data. These data structures can be centralized or distributed and are called directories. For each block of data there is a directory entry that contains a number of pointers, which are configured to indicate system agent(s) where block copies are located and, as a result, keep track of the cached copies of the data block.

When the number of sharer agents in a system is large, maintaining a bit vector for the sharers is more efficient than binary pointers for each sharing agent. Each directory entry also contains a dirty bit to specify whether a unique cache has a permission to write the associated block of data. In implementation, a cache miss results in communication between the node where the cache miss occurs and the directory so that the information in the affected caches is updated. A coherency protocol is a set of mechanisms to maintain coherence between the caches in a system and define states of the cache lines in the system, conditions, and transition between the states and operations and communications performed during coherent read and write requests. MSI is an example of a coherence protocol employed to maintain coherence in a multi-processor system. The letters M (modified), S (shared) and I (Invalid) in the protocol name identifies possible states in which a cache line can be as specified by the protocol.

Each directory entry typically contains a tag corresponding to the address of a given memory block, identifying information for locating all processors that are caching the block, and a status field indicating whether the cached copies are valid. Directory information of a node is used to evaluate read and write requests pertaining to the memory blocks of the node, and to send out coherency messages to all caches that maintain copies. When a processor in the system updates a shared memory block, directory having jurisdiction over the memory block is consulted to determine caches that hold copies of the block. Before the write operation can proceed, invalidation messages are sent to the identified caches and invalidation acknowledgements must be returned to verify that all cached copies have been invalidated. In similar fashion, when a processor requests read access to a shared memory block, the directory having jurisdiction over the block is consulted to identify location and status of all cached copies. Based on the information in the directory, requested block can be provided to requestor from one of the caches holding a valid copy, or from main memory of the node that stores the block.

An efficient data structure is needed to implement directory tables where coherent cache lines addresses, their sharers, and states are tracked. Architecture of such a table should have an implication on the total amount of memory needed for tracking all coherent cache line addresses in the system, mode/manner of utilization of such memory, and performance of the system.

Snooping is a process where individual caches monitor address lines for access to memory locations that they have cached instead of a centralized directory-like structure doing it. When a write operation is observed to a location that a cache has a copy of, the cache controller invalidates its own copy of the snooped memory location. In the snooping solution, a snoopy bus is incorporated to send all requests for data to all processors, wherein the processors snoop to see if they have a copy and respond accordingly. This mechanism therefore involves a broadcast, since caching information is stored in the processors. A multiple snoop filter reduces the snooping traffic by maintaining a plurality of entries, each representing a cache line that may be owned by one or more nodes. When replacement of one of the entries is required, the snoop filter selects for replacement of the entry representing the cache line or lines owned by the fewest nodes, as determined from a presence vector in each entry. A temporal or other type of algorithm is used to refine selection of whether more than one cache line is owned by the fewest number of nodes.

In related art, structures for directory entries are static and consistent. Directory entries reference an address in a cache for a single agent in a one to one manner. However, as the agents associated with the hardware system increase in number, problems in scalability may begin to occur with such rigid directory structures. For example, in an implementation involving a Network on Chip (NoC), directories can be utilized to maintain cache coherency among the agents associated with the NoC as explained above. As the number of agents increases, maintaining of cache coherency for the agents associated with the NoC may become more difficult.

SUMMARY

The present application is directed to a control circuit that provides a directory configured to maintain a plurality of entries, wherein each entry can indicate sharing of resources, such as cache lines, by a plurality of agents/hosts. Each entry can further indicate a cache coherent state of an address. Control circuit of the present can further provide consolidation of one or more entries having a first format to a single entry having a second format when resources corresponding to the one or more entries are shared by the agents. First format can include an address and a pointer representing one of the agents, and the second format can include a sharing vector indicative of more than one of the agents. In another aspect, the second format can utilize, incorporate, and/or represent multiple entries that may be indicative of one or more resources based on a position in the directory. Control circuit can further be configured to update the sharing vector of the one or more entries configured in the second format upon an addition or relinquishment of associated resources by one of the agents.

Aspects of the present invention may include a method that allows maintaining a directory for a plurality of entries, where each of entry can indicate sharing of associated resources by a plurality of agents. Method of the present invention can further allow consolidating one or more entries present a first format into a single entry in a second format selected from a set of possible formats. Associates resources of the present invention can correspond to resources that are shared by multiple agents.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In an aspect, the present disclosure relates to a control circuit that provides a directory configured to maintain a plurality of entries, wherein each entry can indicate sharing of associated resources, such as cache lines, by a plurality of agents/hosts. Each entry can further indicate a cache coherent state of an address. In an example embodiment, the directory is a set-associative directory.

Control circuit can further provide consolidation of one or more entries having a first format to a single entry having a second format when associated resources corresponding to the one or more entries are shared by the agents. In one aspect, the first format can include an address and a pointer representing one of the agents, and the second format can include a sharing vector indicative of more than one of the agents. In another aspect, the second format can utilize, incorporate, and/or represent multiple entries that may be indicative of one or more associated resources based on a position in the directory. Control circuit can further be configured to update the sharing vector of the one or more entries configured in the second format upon an addition or relinquishment of associated resources by one of the agents.

Figure 3A:
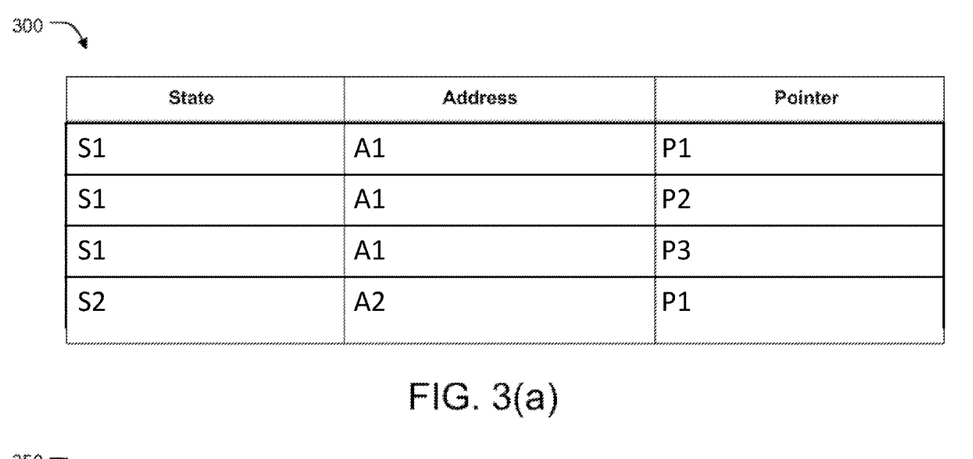
FIGS. 3(a) and 3(b) illustrate example formats that can be used in the directory structure, in accordance with an example implementation.
Figure 3B:
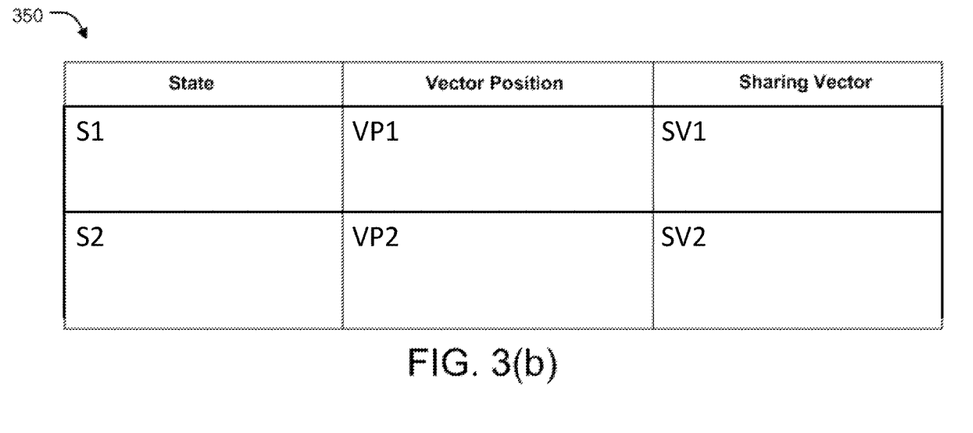

Example implementations described herein relate to a directory structure that is configured to manage entries involving a plurality of formats to track sharing of resources among agents. FIGS. 3(a) and 3(b) illustrate example formats that can be used in the directory structure, in accordance with an example implementation. In the example of FIG. 3(a), format may include a state, which is a bit flag indicator configured to indicate state of an address (e.g., modified, shared, etc.), an address configured to indicate hardware address location within an agent, and a pointer configured to point to a specific agent. In the example of FIG. 3(b), the format can include a state indicating the status of an address, a vector position configured to indicate the address, and a sharing vector configured to indicate agents that share the same resources as indicated by the address. Example format structures of FIGS. 3(a) and 3(b) can be used to hold entries representative of a single agent or multiple agents, respectively. Further, multiple entries in the format, as illustrated in FIG. 3(a), can be consolidated into a single entry in the format of FIG. 3(b) for multiple agents that share the same address and state information. As would be appreciated, consolidation results in space saving within the directory structure as multiple entries are consolidated into a single entry. Additional formats can also be utilized depending on the desired implementation. For example, if some of the associated agents utilize different formats for managing their respective hardware resources, entries and updates regarding the hardware resource can be entered into the directory in the format of the associated agent.

Specific implementations of directory fields including address, state, sharing vector and vector position can be conducted as desired. For example, sharing vector may be in the form of a bit vector with each bit being indicative of the agent having the same hardware address location with the same state information, or can be implemented as each bit being indicative of a range of agents with the same state information. In another example, state and address information can be combined to form an indication of cache coherent state of the address. Address and state information can be indicative of cache lines for a hardware system, with the sharing vector indicative of the sharing of the cache lines.

Management of directory can be based on the adding or the relinquishing of the sharing of the resources by the agents. For example, in an implementation where a NoC manages the directory, the NoC can update the directory based on feedback from associated agents and consolidate entries based on feedback indicating that resources are being shared by additional agents. Similarly, upon release of shared resources, associated entry can be updated accordingly. In an example implementation, when the sharing vector is indicative of only a single agent having the address and state information as indicated, the entry can be reverted back from a consolidated entry format as illustrated in FIG. 3(b) to a single entry format as illustrated in FIG. 3(a).

Figure 4:
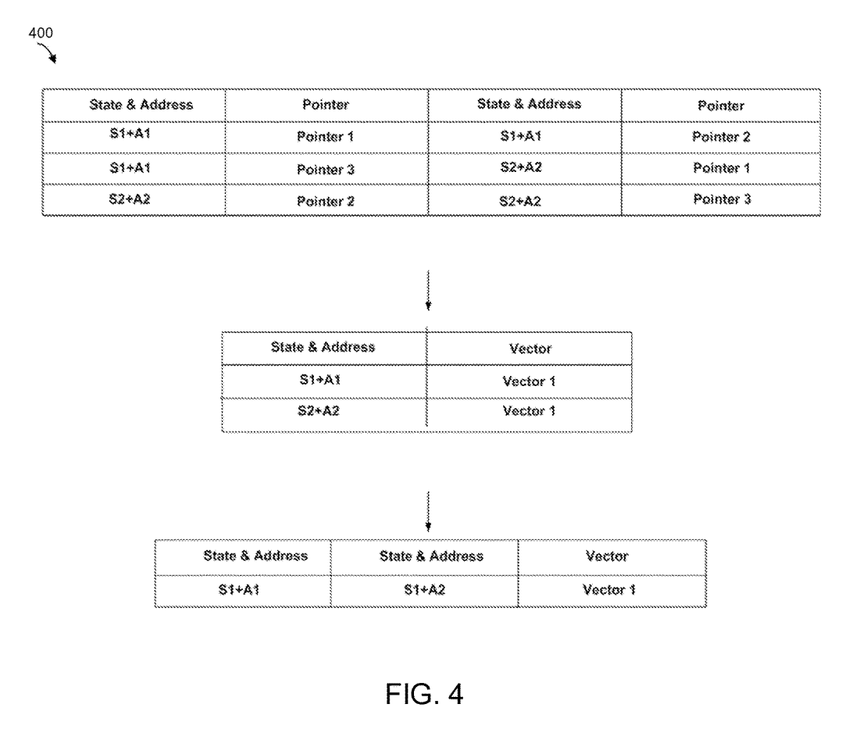
FIG. 4 illustrates an example consolidation of entries within a directory in accordance with an example implementation.

In an example implementation of the formats of FIG. 3(a) and FIG. 3(b) and of consolidation within the directory, format as illustrated in FIG. 3(a) can be consolidated in an associative manner to associate addresses with bit vectors. FIG. 4 illustrates an example consolidation of entries within a directory in accordance with an example implementation. In the example as illustrated in FIG. 4, resources in a format as depicted in FIG. 3(a) can be consolidated into single entries in a format as depicted in FIG. 3(b). Suppose the resources located in address 1 have a state 1 (S1+A1), and resources located in address 2 have state 2 (S2+A2), both being shared among the same agents, in which case the same bit vector (vector 1) in the format as depicted in FIG. 3(b) can be incorporated. Entries can be consolidated in a set associative manner to have a group of addresses adjacent to the bit vector in order to indicate the association of the bit vector with the group of addresses. Thus, when an address entry is referenced in the directory, entries can be traversed until the adjacent corresponding bit vector is found. This example of consolidation allows the directory structure to be freeform in two dimensions and can remove constraints in the format of the directory structure. Position of the bit vector in the directory can thereby be indicative of the associated resources shared by the agents indicated in the bit vector.

In an example implementation involving a freeform two dimensional directory structure and position based association, each entry can thereby be arbitrarily composed. For example, as illustrated in FIG. 4, each entry can include an address, a sharing vector, or a pointer. Thus, the formats of FIG. 3(a) and FIG. 3(b) can utilize multiple entries within the directory structure, which can be positionally rearranged based on the association.

In another example implementation, when an entry is added to a directory or modified, an eviction policy can be employed to configure associative sets. This can occur if an entry is removed due to addition or removal of an agent from the shared resource, or from other updates that affect set associativity. In one example implementation, each entry in the associative set can be popped and new entries can be placed to represent the changed state. In another example implementation, only the bit vector affected by the modification is popped from the directory, and then a snoop is sent to the agents in the bit vector to ensure removal of sharing of the resource. Entries can thereby be replaced based on a desired implementation. In one example implementation, LRU can be applied to replace the entries. In another example implementation, when additional entries are added to a full directory, smaller associative sets can be popped to add the entries.

Figure 5:
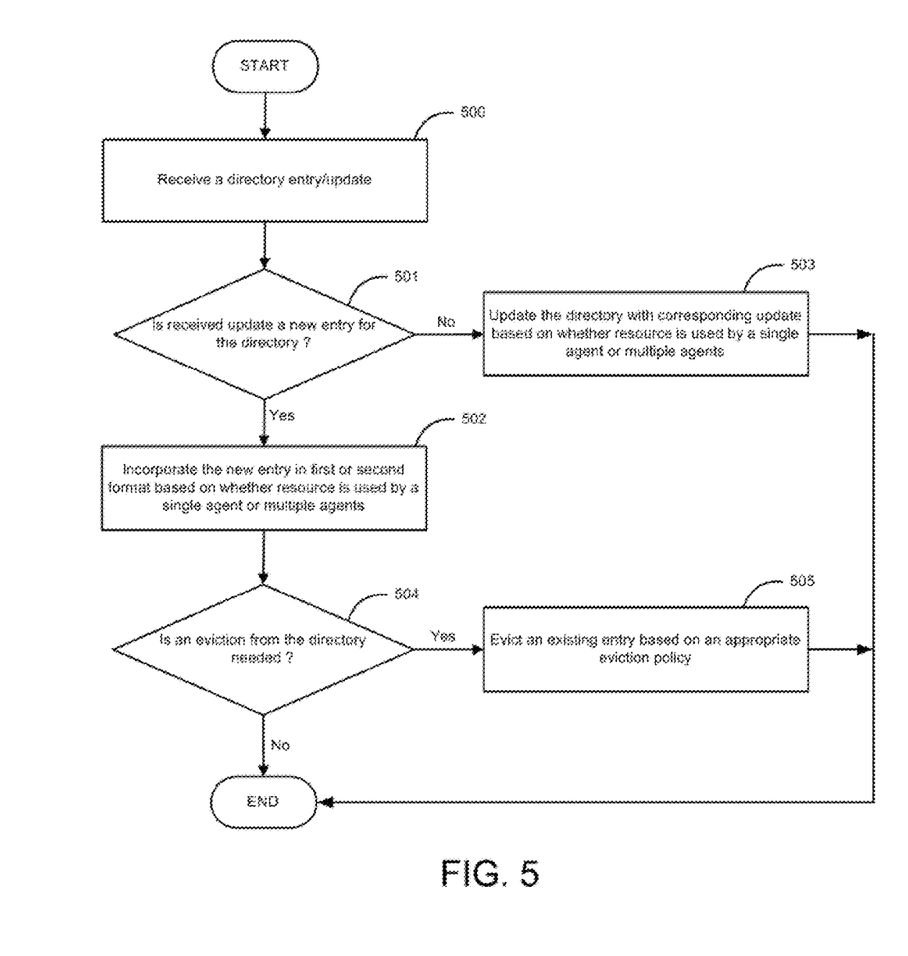
FIG. 5 illustrates an example flow diagram in accordance with an example implementation.

FIG. 5 illustrates a flow diagram for directory management in accordance with an example implementation. The flow begins at 500, when the hardware system managing the directory receives an entry or an update regarding one of the managed hardware resources. The entry or update may be a response to a broadcast, specific queries to agents, or by other methods known to one of ordinary skill in the art. At 501, the received entry/update is checked against other entries in the directory to determine if it is a new entry. In case the update/entry is a new entry, at 502, the new entry is entered in either a first format if the resource is used by a single agent or in a second format if used by multiple agents.

At 503, directory is update with the corresponding entry/update. Such an updation in the direction to the corresponding entry can involve conversion of the entry from the first format into the second format if the resource is shared by more than one associated agents. The entry can also be converted from the second format to the first format if the resource is only used by a single agent, or from the first format to the second format if the resource is used by multiple agents. Additionally, if the directory is arranged in a set associative manner, the entry can be arranged according to a corresponding associated set.

At 504, it is determined as to whether the directory structure needs to evict an existing entry when the new entry/update is entered. The eviction may be utilized, for example, if a directory is full. At 505, in case an eviction is required, an entry is selected for eviction based on a suitable eviction policy such as LRU or smallest associative set.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A control circuit configured to:
maintain a directory for a plurality of entries, the directory configured to facilitate a plurality of formats for the plurality of entries, each of the plurality of entries indicative of sharing of associated resources by a plurality of agents; and
consolidate more than one of the plurality of entries in a first format from the plurality of formats into one or more entries in a second format from the plurality of formats when one of the associated resources corresponding to the more than one of the plurality of entries is shared by multiple ones of the plurality of agents.

2. The control circuit of claim 1, wherein the sharing of associated resources is sharing of cache lines for a hardware system.

3. The control circuit of claim 1, wherein each of the plurality of entries is indicative of a cache coherent state of an address.

4. The control circuit of claim 1, wherein the first format comprises an address and a pointer representing one of the plurality of agents; wherein the second format comprises a sharing vector indicative of more than one of the plurality of agents.

5. The control circuit of claim 1, wherein the control circuit is further configured to update the sharing vector of the plurality of entries configured in the second format upon an adding or relinquishing of the sharing of associated resources by one of the plurality of agents.

6. The control circuit of claim 1, wherein the first format comprises an address and a pointer representing one of the plurality of agents; wherein the second format utilizes multiple ones of the plurality of entries.

7. The control circuit of claim 6, wherein the multiple ones of the plurality of entries of the second format are indicative of a single one of the associated resources based on a position in the directory.

8. The control circuit of claim 1, wherein at least one of the first format and the second format utilizes multiple ones of the plurality of entries.

9. The control circuit of claim 1, wherein the directory is a set associative structure.

10. A method, comprising:
maintaining a directory for a plurality of entries, the directory configured to facilitate a plurality of formats for the plurality of entries, each of the plurality of entries indicative of sharing of associated resources by a plurality of agents;
consolidating more than one of the plurality of entries in a first format from the plurality of formats into one or more entries in a second format from the plurality of formats when one of the associated resources corresponding to the more than one of the plurality of first entries is shared by multiple ones of the plurality of agents.

11. The method of claim 10, wherein the sharing of associated resources is sharing of cache lines for a hardware system.

12. The method of claim 10, wherein each of the plurality of entries are indicative of a cache coherent state of an address.

13. The method of claim 10, wherein the first format comprises an address and a pointer representing one of the plurality of agents; wherein the second format comprises a sharing vector indicative of more than one of the plurality of agents.

14. The method of claim 10, further comprising updating the sharing vector of the plurality of first entries configured in the second format upon an adding or relinquishing of the sharing of associated resources by one of the plurality of agents.

15. The method of claim 10, wherein the first format comprises an address and a pointer representing one of the plurality of agents; wherein the second format utilizes multiple ones of the plurality of entries.

16. The method of claim 15, wherein the multiple ones of the plurality of entries of the second format are indicative of a single one of the associated resources based on a position in the directory.

17. The method of claim 10, wherein at least one of the first format and the second format utilizes multiple ones of the plurality of entries.

18. The method of claim 10, wherein the directory is a set associative structure.

* * * * *